United States Patent [19]

Crook

[11] Patent Number: 5,142,478
[45] Date of Patent: Aug. 25, 1992

[54] COMPUTERIZED AIRCRAFT LANDING AND TAKEOFF SYSTEM

[76] Inventor: Mitchell M. Crook, P.O. Box 397, Greenfield, Mo. 65661-0397

[21] Appl. No.: 711,491

[22] Filed: May 28, 1991

Related U.S. Application Data

[63] Continuation-in-part of Ser. No. 181,676, Sep. 23, 1988, abandoned.

[51] Int. Cl.⁵ ............................................. G06F 15/50
[52] U.S. Cl. .................................. 364/428; 364/427; 73/178 T; 244/183
[58] Field of Search ............... 364/427, 428, 429, 430; 73/178 T, 197, 972, 959; 244/184, 186, 183

[56] References Cited

U.S. PATENT DOCUMENTS

| | | | |
|---|---|---|---|
| 4,122,522 | 10/1978 | Smith | 364/427 |
| 4,194,244 | 3/1980 | Lewis | 364/428 |
| 4,316,252 | 2/1982 | Cooper | 364/428 |
| 4,319,219 | 3/1982 | Rein-Weston | 304/428 |
| 4,419,731 | 12/1983 | Paffett | 364/428 |
| 4,454,582 | 6/1984 | Cleary et al. | 73/178 T |
| 4,482,961 | 11/1984 | Kilner et al. | 364/428 |
| 4,577,275 | 3/1986 | Adams et al. | 364/433 |
| 4,638,437 | 1/1987 | Cleary et al. | 364/427 |

Primary Examiner—Thomas G. Black

[57] ABSTRACT

An aircraft upon approaching a runway for a landing receives a "measurable signal" from a transmitter located at the far end of the active runway. The strength of this "measurable signal" is indirectly proportional to the distance between the aircraft and the transmitter. After this signal strength is converted to digital data, a computer uses this distance in conjunction with preprogrammed performance characteristics of the aircraft to make a "safe" or "unsafe" decision. This decision is communicated to the pilot by means of a special meter on the instrument panel. The "safeness system" may be coupled to the aircraft's automatic braking system to provide a correct amount of deceleration. If properly enabled, this "safeness system" will initiate a go-around for another try at the landing should the current landing attempt be unsafe. A similar procedure would also abort a takeoff should the aircraft not reach rotation speed in time to clear an obstacle at the end of the runway.

4 Claims, 2 Drawing Sheets

COMPUTERIZED AIRCRAFT LANDING AND TAKEOFF SYSTEM

BACKGROUND OF THE INVENTION

1. Technical Field

Aircraft instrument and control systems using digital computer and transmitter/receiver systems operating in the area of 4000 MHz.

2. Description of Prior Art

All modern commercial aircraft are equipped with navigation instruments that give the pilot information to locate the airport add some are certified to descend to the ground. But when landing an aircraft in low visibility conditions most existing systems do not provide sufficiently accurate data to determine if the aircraft can be stopped in the length of runway remaining. The ability to know this, or, if taking off, know that the aircraft can clear an obstacle at the end of the runway would not only add to safety, but would also contribute to increased revenues for the airlines because they would no longer have to cancel flights due to fog, or waste fuel in holding patterns.

SUMMARY OF THE INVENTION

A transmitter located at the end of an airport runway transmits a signal that is received by an aircraft approaching for a landing. The amplitude of this signal is converted into digital form and sent to a computer to compute distance and ground speed. Other data is taken from existing aircraft instruments and used with distance and ground speed to make computations that assure a safe takeoff or landing in low visibility conditions. This is accomplished by providing the pilot with a special instrument for takeoff/landing "safeness" and by making the go-around decision should it be necessary. Because of the dependence on the computer to make decisions that can affect life, the computer uses triple redundancy and a polling procedure that dictates that at least two of the three identical computer elements must agree before an action is taken.

The transmitter uses a superhigh frequency (SHF) that is essentially a line of sight transmission in order to achieve the necessary accuracy. Because the absorption of transmitted energy at this frequency is easily predicted, the basic premise of this patent application is that distance can be computed by measuring signal strength of the R.F. carrier (referred herein as "measurable signal"). Self test circuits are provided to assure the stability of the transmitter, and a status code is added to the carrier so that the aircraft knows whether to "trust" the "measurable signal".

Since only one transmitter should be activated at one time, the control tower will select the transmitter associated with the runway in use.

DETAILED DESCRIPTION OF THE INVENTION

The following description describes a system to safely land an aircraft in low visibility conditions such as fog or low clouds. It assumes that normal navigational instruments such as glide slope and marker beacons are utilized to align the aircraft to the runway, and control the descent. The function of the "safeness system" is to continuously monitor the progress of the landing and take appropriate actions if the aircraft is in danger of landing short of the runway, or so long that the aircraft cannot be stopped before the end of the runway is reached.

Figure 4:
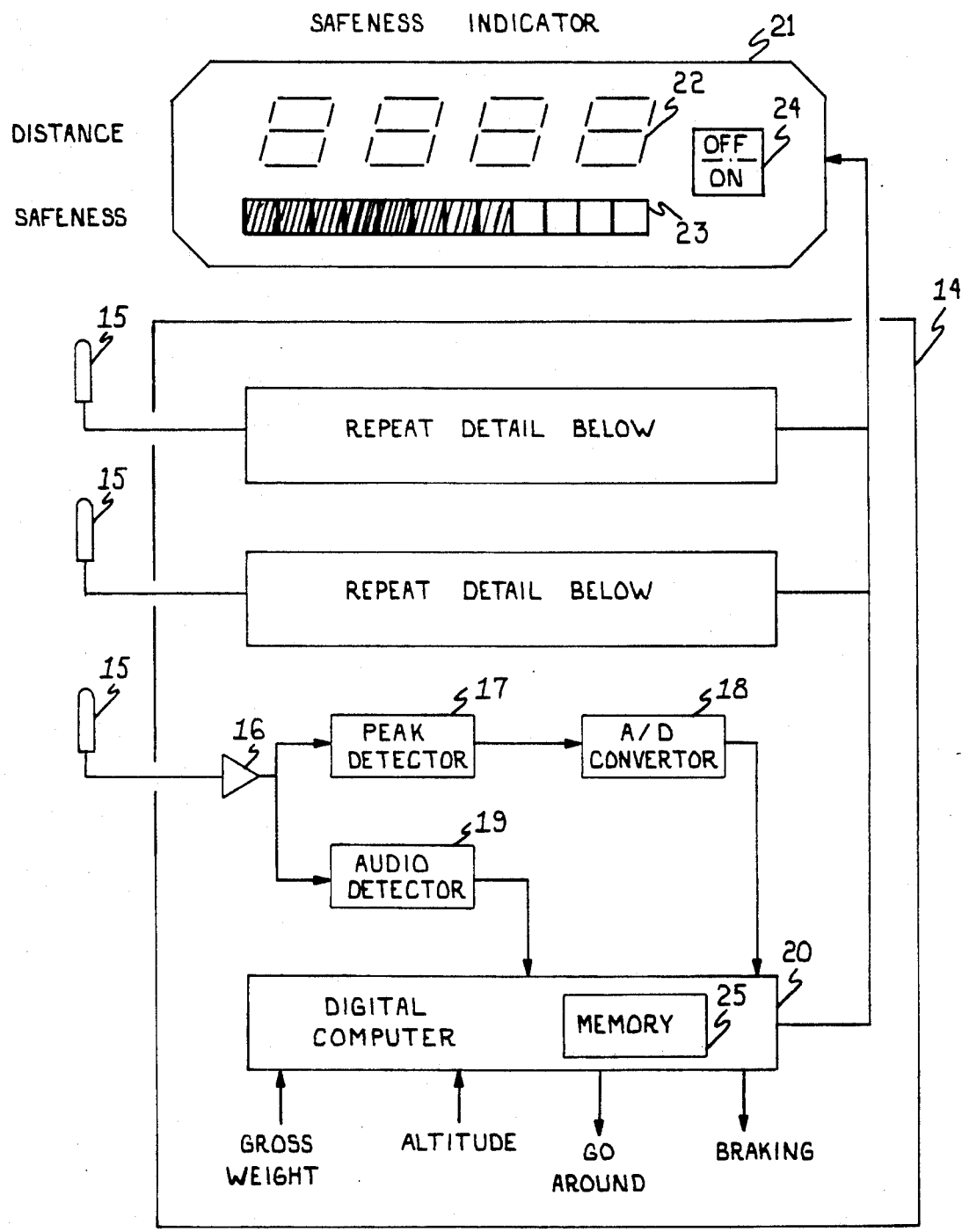
FIG. 4 is a block diagram of components onboard the aircraft.

As shown in figures and 2, the measurable signal transmitter 2 located at the far end of the active runway 1 continuously transmits a constant amplitude signal that is received by a "safeness system" on board a landing aircraft 3. Since the amplitude of the signal decreases with distance from the transmitter, measuring this amplitude will enable slant range distance (d1) to be computed. Because altitude, from the radar altimeter, is being sent to the safeness system, further computations provide the ground distance (d2). Successive computations of ground distance (d2) will yield a profile that predicts the point where the aircraft will touch the runway 4. Since gross weight and braking performance are known, the distance from the end of the runway to the location the aircraft would be when it comes to a complete stop (d3) can be computed. The pilot is continually informed as to the "safeness" of landing by an indicator, 21 of FIG. 4. If enabled by the pilot, the autopilot and automatic braking system can be controlled by the "safeness system" to initiate a go-around or apply the correct amount of braking.

Figure 1:
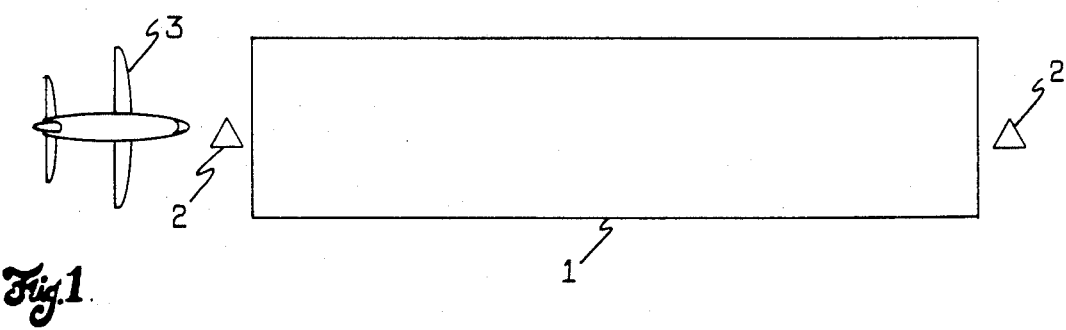
FIG. 1 illustrates the airport runway and transmitter relationships from a horizontal viewpoint.
Figure 2:
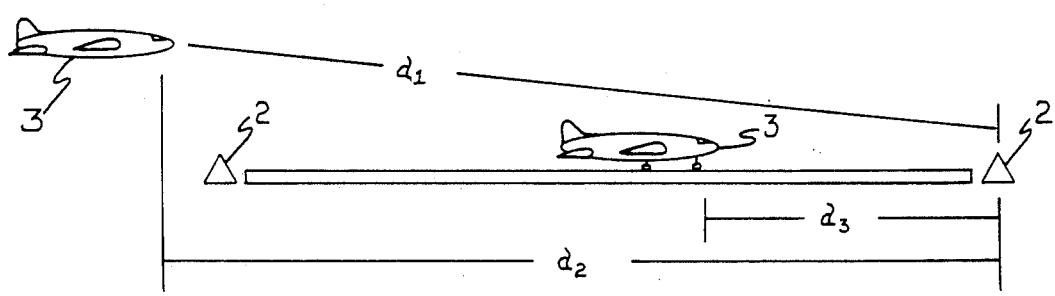
FIG. 2 illustrates the aircraft runway and transmitter relationships from a vertical viewpoint.
Figure 3:
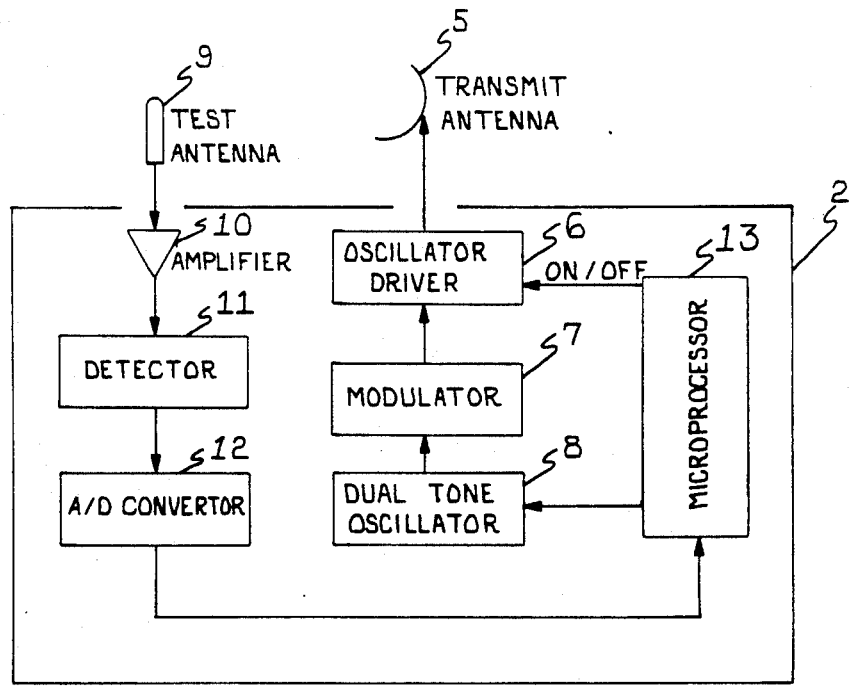
FIG. 3 is a block diagram of the runway transmitter.

FIG. 3. The transmitter 2 is a key element of the system. It must continuously direct a radio frequency beam of a closely controlled amplitude down the active runway. The radio frequency signal from the driver 6 that is sent to the transmit antenna 5 is frequency modulated 7 with audio frequencies 8 that send information to the aircraft. These audio frequencies identify the signal as being from the "safeness system" and that the amplitude being transmitted is within limits. If the amplitude is outside the limits, the microprocessor 13 will first attempt to bring the amplitude of the transmitted signal back into limits. If it is unsuccessful, information is sent that the received signal should not be relied upon for situation where the pilot cannot visually verify the safeness of the landing. This self testing is accomplished by using a separate antenna 9 to sample the transmitted signal, amplify it 10, detect its amplitude 11, convert this amplitude to digital waveforms 12, and apply the result to a microprocessor 13. The microprocessor continuously compares the amplitude signal to the limits that are stored internally and then outputs an "ok" or "not dependable" code to be frequency modulated onto the transmitted signal.

The frequency of the transmitted signal will be in the area of 4000 MHz.

The "safeness computer" 14 is located onboard the aircraft. It is designed and programmed in such a way that with the information being fed into it, it will continually make the "safeness" decision for the landing. If it determines that the landing is unsafe, it will automatically put the aircraft into the go-around mode for another attempt at a landing if the pilot has enabled this feature. If the landing is safe, this computer will feed braking information to the automatic braking system as to the amount of braking energy required to stop the aircraft. Each aircraft installation will be programmed with a model of the aircraft's braking and other performance capabilities.

The "safeness computer" receives the measurable signal at all three of the receiving antennas 15. After amplification 16, the signal is detected 17 and converted into digital format 18 and sent to the digital computer 20. It is this input that the computer uses to determine distance. The amplified signal 16 is also sent to a circuit to recover the audio frequencies 19 that were added to the transmitted measurable signal. It is these frequencies that the computer will use to accept or reject the measurable signals being valid.

Altitude and gross weight are input from other aircraft instruments and when combined with aircraft performance criteria that is stored in the computers non-volatile memory 25, provides that information that is necessary to compute how quickly that aircraft can be stopped once it is on the runway, and when a go-around must be initiated in the event of an aborted landing.

For low visibility takeoffs, the safeness computer turns off the automatic braking system and activates the thrust management system with the "go-around" signal. As the aircraft progresses along the runway, the distance remaining is constantly compared to the distance it would take the aircraft to stop. If the wheels have not left the ground by the time the two distances are equal, the takeoff is aborted.

The "safeness" of the takeoff or landing is constantly shown by a cockpit panel indicator 21. This indicator has three functions. The first function is the ON/OFF indicator. If the safeness transmitter 2 is not sending the measurable signal or if the microprocessor senses that the signal cannot be relied on, this ON/OFF indicator displays "OFF". The second function is the distance display 22 which shows the ground distance between the aircraft and the end of the runway. The third function is the "safeness" display 23. The display consists of a series of red, yellow and green lights that provide the pilot with a relative indication of whether the landing or takeoff is safe as it relates to the length of the runway.

I claim:

1. An aircraft landing system for determining whether an aircraft can safely land comprising:
   (a) a transmitter, located at a known location at the end of the runway, for transmitting a signal;
   (b) a receiver, located on the aircraft, for receiving said transmitted signal;
   (c) first means for sensing the altitude of the aircraft;
   (d) second means for determining a slant range distance between said transmitter and receiver as a function of the amplitude of the received signal, and for determining the ground distance between the aircraft and said transmitter as a function of said slant range distance and said altitude, said ground distance being equal to the remaining length of the runway;
   (e) third means for determining if said aircraft can safely land based on said ground distance;
   (f) display means for indicating whether the aircraft can safely land before reaching the end of the runway;
   (g) control means for initiating a go-around maneuver if said third means determine said aircraft cannot safely land.

2. An aircraft takeoff system according to claim 1, said third means further including:
   (a) means for determining how quickly the aircraft can be stopped once it is on the runway wherein said control means initiates said go-around maneuver if said aircraft cannot be stopped before the end of the runway.

3. An aircraft takeoff system for determining whether an aircraft can safely takeoff comprising:
   (a) a transmitter, located at a known location at the end of the runway, for transmitting a signal;
   (b) a receiver, located on the aircraft, for receiving said transmitted signal;
   (c) first means for determining a distance between said transmitter and receiver as a function of the amplitude of the received signal, said distance being equal to the remaining length of the runway;
   (d) second means for determining if said aircraft cannot safely takeoff based on said distance;
   (e) display means for indicating whether the aircraft can safely takeoff before reaching the end of the runway;
   (f) control means for initiating braking if said second means determines said aircraft cannot safely takeoff.

4. An aircraft takeoff system according to claim 3, said second means further including:
   (e) means for comparing said distance to a distance it would take the aircraft to stop, wherein the takeoff is aborted if the wheels have not left the ground by the time said distance is equal t the distance it would take the aircraft to stop.

* * * * *